US011520781B2

(12) United States Patent
Stolze et al.

(10) Patent No.: US 11,520,781 B2
(45) Date of Patent: Dec. 6, 2022

(54) EFFICIENT BULK LOADING MULTIPLE ROWS OR PARTITIONS FOR A SINGLE TARGET TABLE

(71) Applicant: International Business Machines Corporation, Armonk, NY (US)

(72) Inventors: Knut Stolze, Hummelshain (DE); Felix Beier, Haigerloch (DE); Luis Eduardo Oliveira Lizardo, Böblingen (DE); Reinhold Geiselhart, Rottenburg-Ergenzingen (DE)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 17/023,490

(22) Filed: Sep. 17, 2020

(65) Prior Publication Data

US 2022/0083540 A1    Mar. 17, 2022

(51) Int. Cl.
*G06F 16/00* (2019.01)
*G06F 16/23* (2019.01)
*G06F 16/2455* (2019.01)
*G06F 16/22* (2019.01)

(52) U.S. Cl.
CPC ...... *G06F 16/2386* (2019.01); *G06F 16/2282* (2019.01); *G06F 16/24554* (2019.01); *G06F 16/24568* (2019.01)

(58) Field of Classification Search
CPC ........... G06F 16/24568; G06F 16/2282; G06F 16/24554; G06F 16/2386
USPC .................................................. 707/741, 602
See application file for complete search history.

(56) References Cited

U.S. PATENT DOCUMENTS

| 10,042,910 | B2 | 8/2018 | Bensberg et al. |
| 10,216,739 | B2 | 2/2019 | Broll et al. |
| 2004/0158570 | A1 | 8/2004 | Thusoo |
| 2012/0239612 | A1* | 9/2012 | George ................ G06F 16/254 707/602 |
| 2015/0142749 | A1 | 5/2015 | Broll et al. |
| 2016/0283572 | A1 | 9/2016 | Slavicek |

(Continued)

FOREIGN PATENT DOCUMENTS

CN     110874383 A    3/2020

OTHER PUBLICATIONS

Miell, P. et al., "The NIST Definition of Cloud Computing", Recommendations of the National Institute of Standards and Technology, NIST Special Publication 800-145, 7 pages, Sep. 2011.

(Continued)

*Primary Examiner* — Chelcie L Daye
(74) *Attorney, Agent, or Firm* — Mark Bergner

(57) ABSTRACT

A computer-implemented system and method process insertions into a target table of a target database system. A single query language INSERT statement is received that is related to a source partition of a source table in a source database system that identifies a block of data (BOD), having a partition identifier (PID), to be inserted into the target table. The INSERT statement contains no literal PID. Responsive to receiving the INSERT statement, a processor receives the BOD from the source table via a data stream, and inserts the BOD into the target table. This reduces the overhead associated with using an INSERT statement to insert multiple rows of data into a target table.

18 Claims, 7 Drawing Sheets

(56) References Cited

U.S. PATENT DOCUMENTS

2017/0147672 A1 5/2017 Arnold et al.
2017/0293530 A1* 10/2017 Brodt .................. G06F 16/2365
2020/0034365 A1 1/2020 Martin

OTHER PUBLICATIONS

PCT/CN2021/117144, International Search Report and Written Opinion, dated Dec. 8, 2021.

* cited by examiner

EFFICIENT BULK LOADING MULTIPLE ROWS OR PARTITIONS FOR A SINGLE TARGET TABLE

BACKGROUND

Disclosed herein is a system and related method for improving efficiency of bulk loading multiple rows or partitions for a single target table in a database accelerator.

Use of partitions in databases can make various database operations more efficient, since certain operations are performed on a portion of a database at a time, instead of the entire database.

When executing certain database commands, such as an INSERT command, it may be beneficial to reduce the overhead associated with such commands, particularly where the amount of payload data involved is small. A single INSERT statement is used on each logical node of the target database system to process a single partition from the source database system. Each INSERT statement introduces overhead in the target database system as well as the database accelerator: an SQL connection is required in which the statement is executed. The statement uses a named pipe to efficiently transfer the data from one process to the other (avoiding costly data transformation steps between different formats). The statement has to be started. Additional overhead is incurred.

If the amount of data to be processed by a single INSERT statement is comparably small, the overhead for all these steps can contribute a significant amount of the overall time for batch loading the data. It would be desirable to reduce the overhead that comes with executing a single INSERT statement in order to insert a part/batch of the data into the table in the target database system. Each batch of the data originates from a specific partition in the source table, possibly further broken down/separated for individual logical nodes in the target database system. Thus, each batch or each row in a batch has an identifier for the source table's partition associated with it.

SUMMARY

According to one aspect disclosed herein, a computer-implemented method is provided to process insertions into a target table of a target database system. The method comprises using a processor for receiving a single query language INSERT statement related to a source partition of a source table in a source database system that identifies a block of data (BOD), having a partition identifier (PID), to be inserted into the target table. The INSERT statement contains no literal PID. Responsive to receiving the INSERT statement, the processor receives the BOD from the source table via a data stream, and inserts the BOD into the target table. Advantageously, this reduces the overhead associated with using an INSERT statement to insert multiple rows of data into a target table.

According to another aspect disclosed herein, a PID of each row of the BOD is inserted into a column of each row after receiving the INSERT statement but prior to inserting said each row into the target table. Advantageously, this allows the PID to be inserted in multiple rows into the target table with use of a single INSERT statement.

According to another aspect disclosed herein, the BOD is organized into a plurality of rows and each row is modified to contain a partition ID value so that the partition ID value is injected in the data stream. Advantageously, this eliminates the overhead associated with the source including the PID.

According to another aspect disclosed herein, the method further comprises specifying a shared memory location that contains a current PID, and writing the current PID to the shared memory location, where the current PID is readable by the target database system. Advantageously, this allows the database accelerator to reference a shared memory location containing the PID.

According to another aspect disclosed herein, the PID is specified in the data stream itself such that each batch of the BOD is preceded with a batch PID and a quantity of rows that the batch PID is applicable to. The method further comprises reading and storing the batch PID and the quantity of rows, and reading a number n of rows corresponding to the quantity of rows from the data stream and processing each read row with the read batch PID. Advantageously, this allows the database accelerator to precisely determine how many rows to apply the PID to.

According to another aspect disclosed herein, the data stream comprises a plurality of data streams that are demultiplexed on the source database system. Advantageously, this allows the data to be efficiently transferred over multiple channels.

According to another aspect disclosed herein, the method further comprises performing the demultiplexing, by the source database system, of rows in the BOD utilizing an unload utility that is started on the source database system in order to extract the BOD from the source table and populate the plurality of data streams. Advantageously, this helps to reduce the amount of resources needed by the database accelerator.

According to another aspect disclosed herein, the method further comprises determining, for all logical nodes in the target database system, unload criteria that identity all rows that go into each respective logical node, and starting the unload utility with the unload criteria. Advantageously, this helps to provide a better organization and more efficient handling of the data to be transferred.

According to another aspect disclosed herein, the method further comprises recombining the plurality of data streams into a single data stream, wherein, in the single data stream, granularity is on blocks or batches of rows instead of single rows, each batch has a header and the header indicates for which target node the block or batch is. Advantageously, this provides an easy mechanism for the accelerator to insert the PID into the rows of the data stream.

According to another aspect disclosed herein, the method further comprises sending directly to the target node on the target database system, the data streams resulting from the demultiplexing of the data on the source database system. Advantageously, this direct communication may reduce potential points of error in the data transmission.

According to another aspect disclosed herein, a method is provided for performing a database transfer, comprising opening, with an UNLOAD utility, a plurality of data streams, one stream for each node in a target database system, scanning all rows of a source table in a source database system. For each row, reading the respective row from the source table, applying an unload criteria to determine a node of the respective row in the target database system, and writing the row to a specific data stream for the target node. Advantageously, this helps to organize the database rows that are transferred to the target system.

According to another aspect disclosed herein, a system is provided for processing insertions into a target table of a target database system, comprising a memory, and a processor, that is configured to receive a single query language INSERT statement related to a source partition of a source table in a source database system that identifies a block of data (BOD), having a partition identifier (PID), to be inserted into the target table, wherein the INSERT statement contains no literal PID, responsive to the receipt of the INSERT statement, receive the BOD from the source table via a data stream, and insert the BOD into the target table. Advantageously, this reduces the overhead associated with using an INSERT statement to insert multiple rows of data into a target table. System features corresponding to related method features are also provided.

A computer program product may be provided that may be used to implement the method and functioning of the system as described above. The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview of the Bulk Loading of Multiple Partitions for a Single Target Table

A system and related method for improving efficiency of bulk loading multiple partitions for a single target table in a database accelerator are provided herein that permit the use of a single INSERT statement that does not contain a partition ID when inserting a block of data (BOD) spanning the multiple partitions. Various mechanisms are disclosed herein that help to reduce overhead that is associated with issuing multiple INSERT statements, such overhead being significant when the amount of payload data involved is small.

Figure 1A:
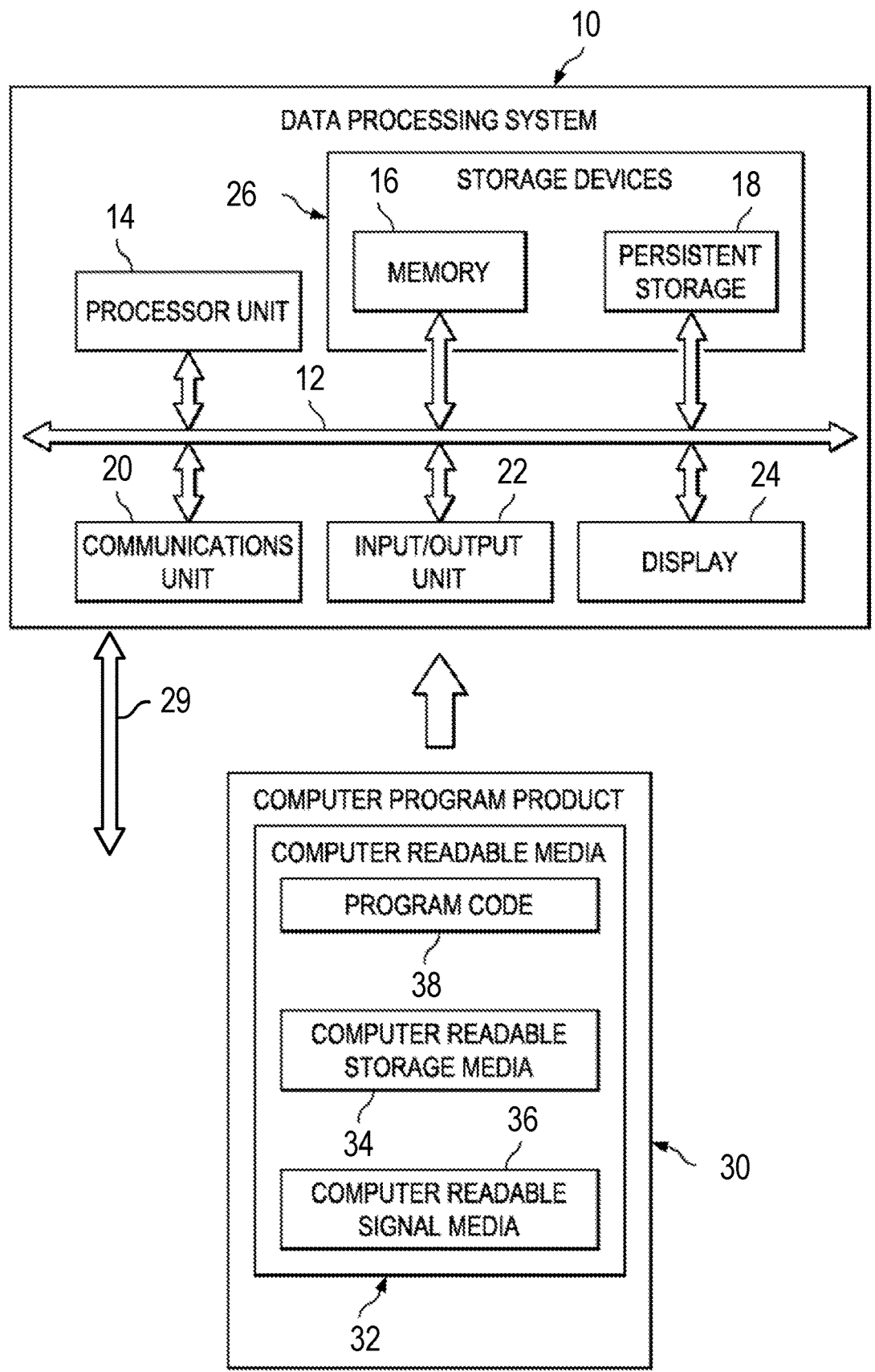
FIG. 1A is a block diagram of a data processing system (DPS) according to one or more embodiments disclosed herein.

The following acronyms may be used below:
API application program interface
ARM advanced RISC machine
BOD block of data
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
SQL Structured Query Language
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
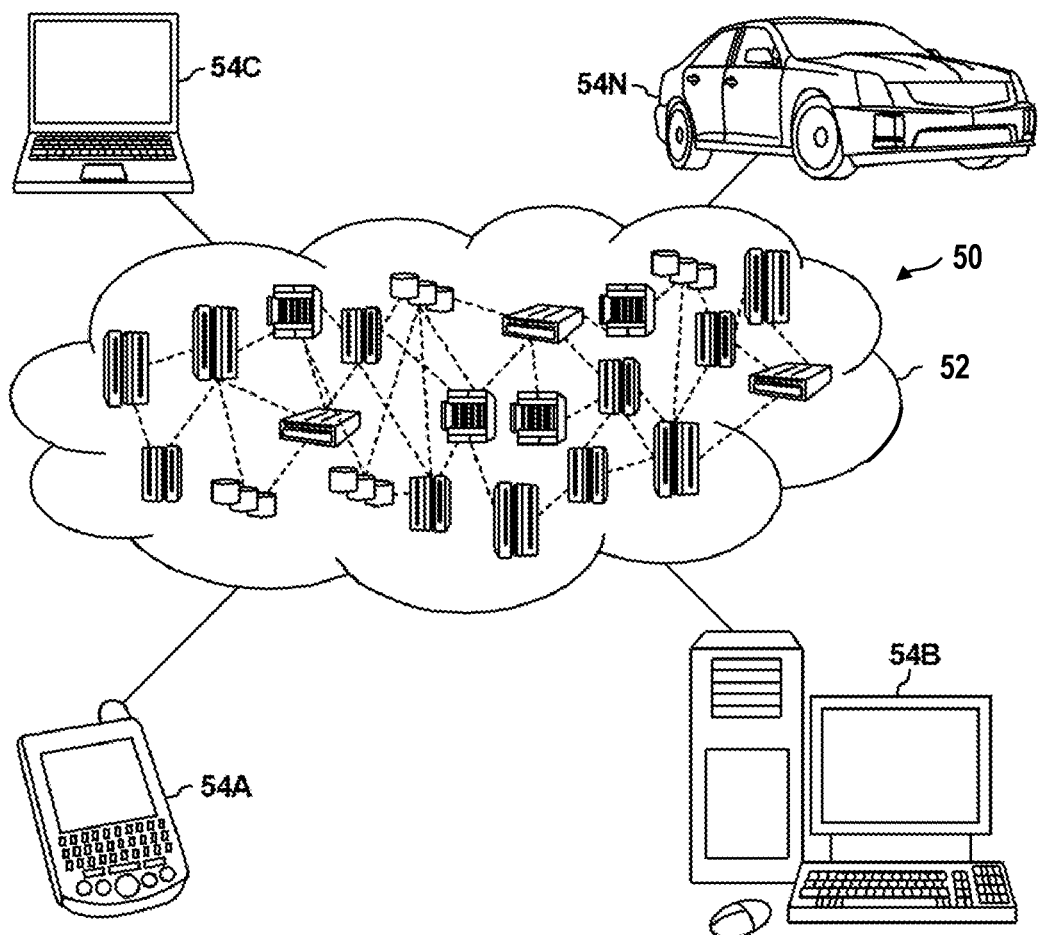
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
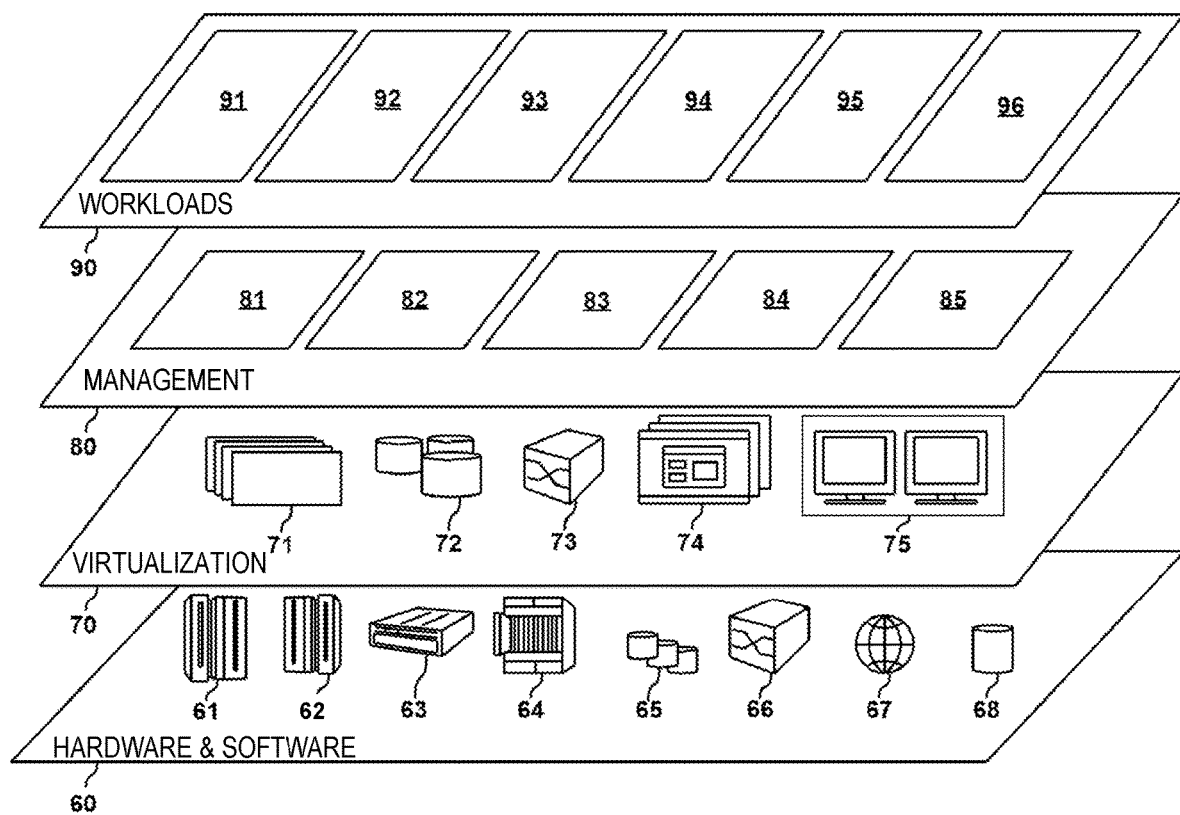
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Efficient Bulk Loading Multiple Rows or Partitions for a Single Target Table

Figure 2A:
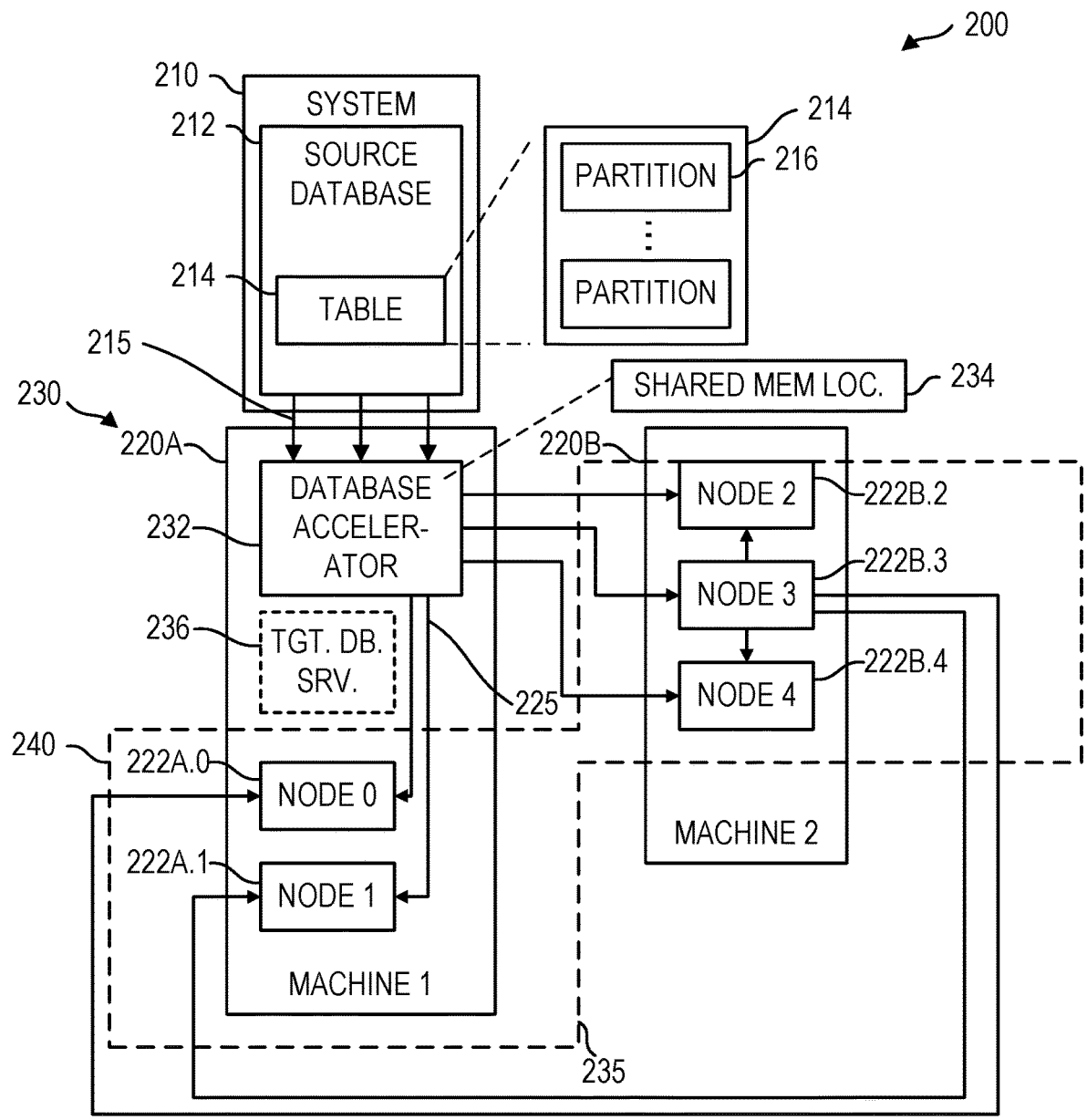
FIG. 2A is a block diagram of a database system having source and target databases with tables, according to some implementations.

FIG. 2A is a block diagram that illustrates a database transfer system 200. The database transfer system comprises a source database 212 that may run in a cloud computing environment 52 on one or more cloud computing nodes 50 that may be comprised of one or more DPSs 10. A user may wish to perform various operations on the source database 212, or a table 214 of the source database, such as a query to obtain various records that meet a particular set of criteria. These records meeting the criteria may then be transferred to a target table 240. The query may make use of a standardized query language, such as SQL.

As can be seen in FIG. 2A, the target table 240 of a target database system 230 may be spread across multiple logical nodes, e.g., Node 0-Node 4 222A.0-222A.1, 222B.2-222B.4 (a target node may be referred to collectively or representatively by ref. no. 222), and the nodes may be spread across multiple machines, e.g., Machine 1 220A and Machine 2 220B (collectively or representatively 220). The queries may be carried out making use of a database accelerator 232, that retrieves data from the source database table 214 in multiple data streams 215. In some embodiments, the system on which the source database 212 runs may separate or demultiplex rows of the source database 212.

Figure 4:
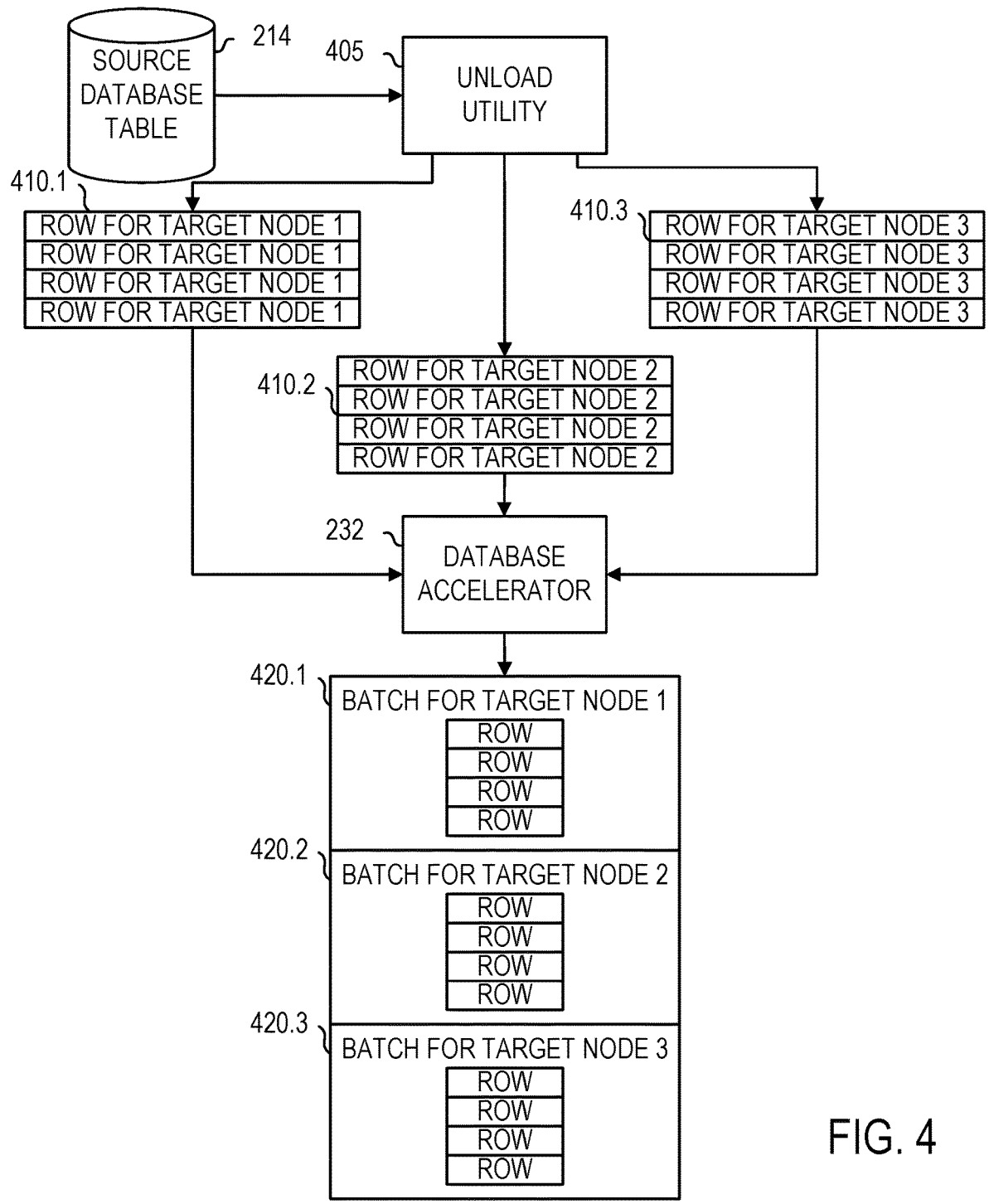
FIG. 4 is a block diagram illustrating a transfer of database rows to the nodes.

In some embodiments, the separation/demultiplexing of the rows is performed by the database accelerator 232, as described herein. In some embodiments (referring also to FIG. 4, which is a block diagram illustrating a transfer of database rows to the nodes), all or part of the separation/demultiplexing is performed by the source database system 210, resulting in the creation of the multiple data streams 215, 410.1, 410.2, 410.3 (the latter being referred to collectively or representatively as 410). In this case, different approaches may be used to achieve row separation. Common is to all that an UNLOAD (or EXPORT) utility 405 is started on the source database system 210 in order to extract the data from the relational source database table 214 in that system 210. The UNLOAD utility here is the component for populating the multiple data stream(s) 215, 410.

Database systems generally provide such utilities to LOAD and UNLOAD (or EXPORT) data from a table. The utilities access the data pages in the system directly, bypassing all layers in the database engine that handle relational processing of the data. Thus, such utilities may operate on the raw data storage in order to deliver the best possible performance. A single execution of an UNLOAD utility 405 provides a single data stream only. It is often possible to configure the utility execution such that only a subset of the data is to be unloaded and written to the data stream. This can be exploited as follows. For all logical nodes in the target database system: a) determine the unload criteria that identifies all rows that will go to the node; and b) start the UNLOAD utility with that unload criteria. The result is a strict 1:1 mapping between UNLOAD utilities executed on the source database system 210 and logical nodes 222 in the target database system. The orchestration and correlation may be handled by the database accelerator component 232. Although this approach requires multiple such utilities to be running (consuming resources and may also imply synchronization between the utilities since they all scan the same data (even if they extract disjoint subsets of rows)), there is an advantage in that UNLOAD utilities may be put to the task with no or small changes for the utility.

The execution of multiple UNLOAD utilities 405 scanning the same data in the source database system 210 may be avoided if the utility 405 itself does not apply a filter to extract the data, but actually handles the separation of the rows into different data streams 215, 410. A new feature is that the UNLOAD utility 405 does the following: 1) opens "n" data streams 410, one stream for each node 222 in the target database system 230; and 2) scans all rows of the table in the source database system 210. For each row, the system: a) reads the row; b) applies the criteria to determine the row's node 222 in the target database system 230; and c) writes the row to the specific data stream for the target node 222. This approach has a significantly smaller footprint than the execution of multiple UNLOAD utilities. Each utility determines the target node 222 for each row, so instead of filtering for rows using that target node 222 and discarding all other rows, each row is consumed right away and is written to a different data stream 215. The multiple data streams 215 (created via the approaches described above) may be transferred to the database accelerator 232 and then on to the target database 240 system in separate batches 420.1, 420.2, 420.3 (collectively or representatively 420). Also, they may be transferred in partitions (FIG. 2B), which may be considered batches of rows. A partition may be further broken down into further batches, as is illustrated by Partition ID 42 (255A, 255B). Separate connections may thus be used-one connection for each data stream 215, 410.

In some embodiments, the data streams 215 are combined into a single one, but here the granularity may be on blocks or batches of rows 420 instead of single rows. In this situation, a process (like database accelerator-stored procedures, which start the UNLOAD utilities 405 and read from the pipes into which various utilities and procedures are writing) compose the batches 420. In this approach, each batch 420 may have a header, and the header indicates which target node 222 the batch 420 is for. This way, the database accelerator 232 server can receive a single data stream and only needs a single TCP/IP connection. But it can very easily separate the rows when sending them to the target nodes 222 by merely looking at the header of each batch and passing on the complete batch to that target node 222.

In some embodiments (not shown), the demultiplexing of the data on the source database system 210 offers another advantage: the data streams 215 may be sent directly to the target node 222. Thus, the physical machine on which the database accelerator 232 server is running may be bypassed. Hence, the computation overhead on that machine is reduced to zero-except for some minor orchestration that may be needed to coordinate an initial establishing of the connection from the database accelerator 232 stored procedure to the target node 222.

As shown in FIG. 2A, the database accelerator 232 is on a same machine 220A as two of the nodes: Node 0 222A.0 and Node 1 222A.1. However, the database accelerator need not share a machine 220A with any of the nodes 222 and may run on a separate machine 220.

The source database table 214 may be divided into individual partitions 214 that each serve as a unit upon which database actions are taken. Partitioning is a database process where very large tables are divided into multiple smaller parts. By splitting a large table into smaller, individual tables, queries that access only a fraction of the data can run faster because there is less data to scan. The main of goal of partitioning is to aid in maintenance of large tables and to reduce the overall response time to read and load data for particular SQL operations.

In some situations where a query is desired, the user may use an SQL INSERT statement to insert new database table records into a table. A basic INSERT statement may be of the form:

```
INSERT INTO target_table (column1, column2, column3, ...)
VALUES (value1, value2, value3, ...);
``` which includes values that are to be inserted into the specified columns of the table.

An INSERT INTO SELECT statement, which requires data types in the source and target tables match, may be of the form:

```
INSERT INTO target_table
SELECT * FROM source_table
```

(copy all (matching) columns from the source table 214 into the target table 240); or of the form:

```
INSERT INTO target_table (column1, column2, column3, ...)
SELECT column1, column2, column3, ...
FROM source_table
```

(copy only some columns from the source table 214 into the target table 240).

The SQL requests may be directed at or routed to the database accelerator 232, which may be used to try to make execution of the SQL requests faster and/or more efficient. One potential problem, however, is that a single INSERT statement may be used on each logical node 222 of the target table 240 system to process a single partition 216 from the source database table 214. Even if a solution is provided where a single INSERT statement is used for each physical machine 220 of the target database system 230, such a solution still uses separate INSERT statements for different partitions in the source table.

Each INSERT statement introduces overhead in the target database system 230 as well as database accelerator 232, such overhead including, e.g., establishing an SQL connection in which the statement is executed, use of a named pipe for the statement to efficiently transfer the data from one process to the other (thereby avoiding costly data transformation steps between different formats), starting the statement, among other things. If the amount of data to be processed by a single INSERT statement is comparably small, the overhead for all these steps can contribute a significant amount of the overall time for batch loading the data.

It is advantageous to reduce the overhead that comes with executing a single INSERT statement in order to insert a part/batch of the data into the table in the target table 214. The overhead reduction may be achieved based on each batch of the data originating from a specific partition 216 in the source table 214, possibly further broken down/separated for individual logical nodes 222 in the target table 240 system. Thus, each batch or each row in a batch may have a partition identifier for the source table's partition 216 associated with it.

In the database accelerator 232, that identifier may be stored in a dedicated column in the target table 240, which means it becomes an integral part of the rows being stored. Older versions of the database accelerator 232 provide the partition ID to the target database system in the SQL statement as follows:

```
INSERT INTO <target-table>
SELECT <partition-id>, *
FROM EXTERNAL TABLE ( ... )
```

With this, a literal in the INSERT statement specifies the partition ID value. However, such a literal cannot be changed during the execution of the SQL statement. It may additionally be possible to specify the value for the partition ID column in the definition of the external table itself. This way it is also an immutable value for the duration of the INSERT statement execution.

Various embodiments permit injecting different values for the partition ID column for a currently running INSERT statement. In a first embodiment, the data stream 215 from which the external table reads is modified. Thus, the INSERT statement becomes:

```
INSERT INTO <target-table>
SELECT *
FROM EXTERNAL TABLE ( ... )
```

In this embodiment, the <partition-id> expression is absent, and it is also not in the specification of the external (source) table. Since no special treatment for the column storing the partition ID column is defined, the target database system handles it as it does any other column. The rows in the data stream 215 actually have to provide the value for this column. Thus, each row has to be modified in transit to contain the partition ID value (e.g., as the first value of the row), followed by the row's value as they were on the source database system.

One issue with this approach is that database accelerator 232 has to inject the partition ID value for each and every row in the data stream 215. While this allows the adjustment of the numerical value and, thus, the handling of rows originating from different partitions, it does add significant overhead to database accelerator 232, which reduces throughput.

In a second embodiment, instead of using a literal in the SQL statement for specifying the partition ID, a parameter marker (or some other mechanism) may be used to specify a shared memory location 234 that is written to by database accelerator 232 and read from by the target database system 230. The following query illustrates such an approach:

```
INSERT INTO <target-table>
SELECT?, *
FROM EXTERNAL TABLE ( ... )
```

A similar technique could be used to include the parameter marker/shared memory location 234 in the specification of the external (source) table 214.

Once a batch of rows for a certain partition ID has been processed and the next batch starts, the value for the parameter marker (or the value in the shared memory location 234) may be modified. Thus, the target database system 230 picks up the modified value and uses it going forward. The advantage with this approach is that the data stream 215—originating from the source database system 210—does not have to be manipulated for each and every row. However, this approach requires synchronization and dedicated synchronization mechanisms. The following timeline of events illustrates this synchronization:

First, the database accelerator 232 writes a batch of rows to the named pipe, which is the last batch for a specific partition ID. Next, the database accelerator 232 writes a new partition ID to the parameter marker/shared memory location. Although FIG. 2A shows the database accelerator 232 communicating directly with the nodes 222, in some embodiments, the target database server 236 reads some data from the named pipe and processes it using the previously known partition ID value. The target database server 236 may detect the change for the partition ID and stores the changed partition ID for all subsequently read data from the named pipe. The synchronization of an exact point when the new partition ID is to be used and applied with the rows in the data stream 215 benefits from using dedicated synchronization mechanisms. In this configuration, the database accelerator 232 offloads queries to the target database server 232 in order to implement the SQL requests, as described above. This offloading includes receiving the query from the source database 212, rewriting the query statements so that it matches the data layout on the target database server 236 (e.g., including partition IDs), forwarding the query to the target database server 236, receiving query results, and forwarding the query results to the source database 212.

In a third embodiment, a run-length encoding for the partition ID embodiment takes advantage of the fact that batches of rows are being processed. The partition ID is specified in the data stream 215 itself, but only once for each batch. Similar to run-length encoding (RLE), each batch is preceded with the partition ID and a quantity of rows that that partition ID is applicable to.

Figure 2B:
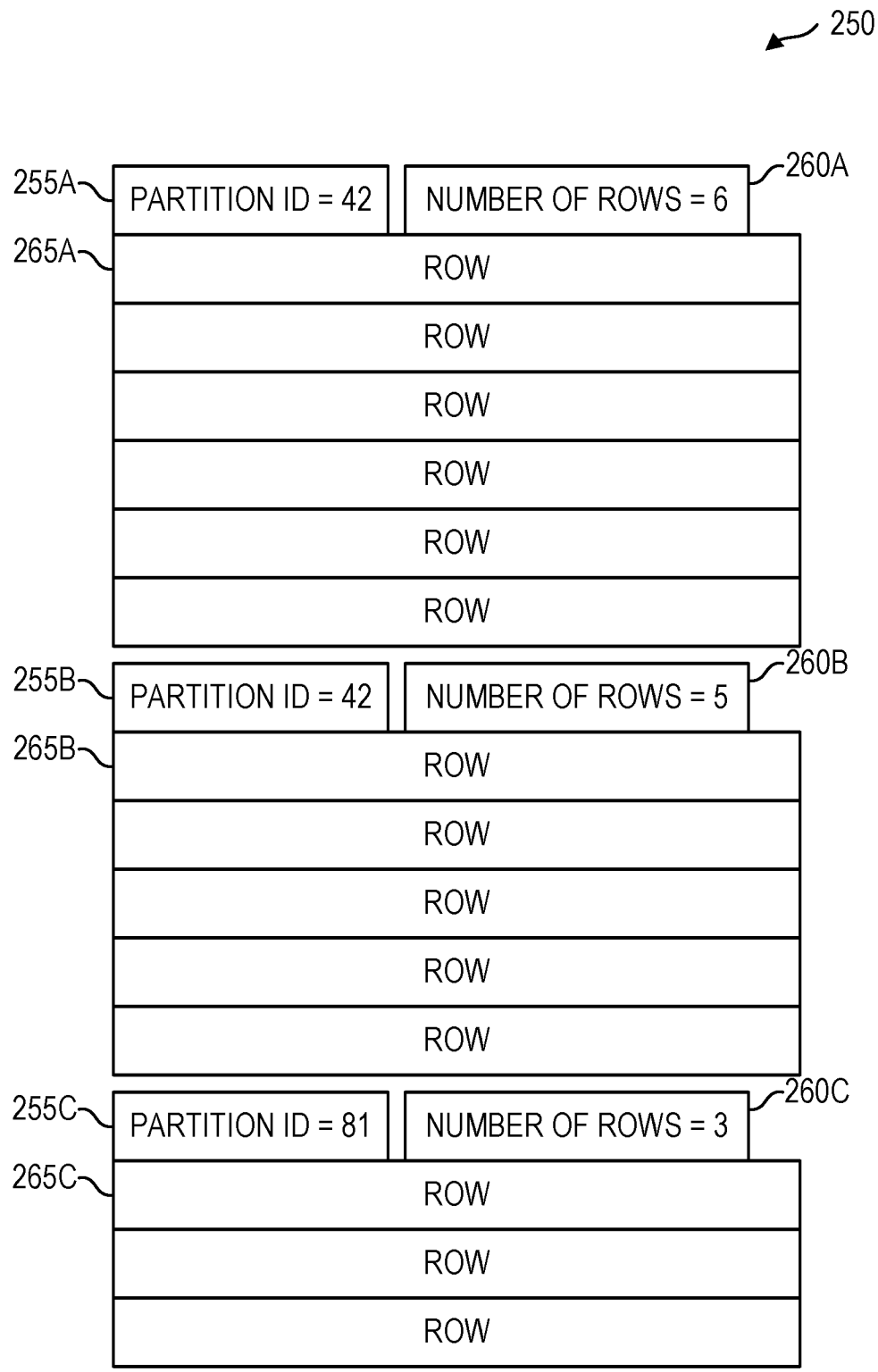
FIG. 2B is a data structure diagram of a data stream, according to some implementations.

FIG. 2B is a data structure diagram illustrating the structure of a data stream 250, according to some embodiments. In this embodiment, a first partition ID 255A and number of rows 260A head off a first section of the data stream, followed by the identified number of rows 265A. Similarly, a second partition ID 255B and number of rows 260B head off a second section of the data stream, followed by the identified number of rows 265B. As illustrated in FIG. 2B, the second partition ID 255B is the same value as the first partition ID 255A, but the operative BOD is separate. Finally, as illustrated, a third partition ID 255C and number of rows 260C head off a third section of the data stream, followed by the identified number of rows 265C. Since partitions 214 in the source table 214 may comprise many more rows than a single batch processed on the logical node 222 of the target database system 230, it is possible for multiple batches (as BODs) to use the same partition ID.

The INSERT statement for this embodiment is the simple one requiring the details about the partition ID in the specification of the external (source) table 214 itself:

INSERT INTO <target-table>
SELECT *
FROM EXTERNAL TABLE ( ... ) USING ( RLE_ENCODED PART ID )

The processing of the data stream 215 read by the target database system 230 becomes, in this illustrative example:

read the first four bytes with the partition ID and store the partition ID; read the number of rows "n" to which the partition ID is applicable; read "n" rows from the data stream and process them as usual with the stored partition ID; and go back to the first step (i.e., read next partition ID to use). In this embodiment, no synchronization between different threads/processes/applications is necessary—it is inherently synchronized.

Various embodiments discussed herein may combine both the handling of the data as an opaque byte (data) stream 215 as much as possible while augmenting each row in the data stream 215 with its explicit partition number. That may be done in a way to handle rows from multiple, different partitions 214 in the source table 214 together via a single INSERT statement on the target table 214 in order to reduce overhead.

Figure 3:
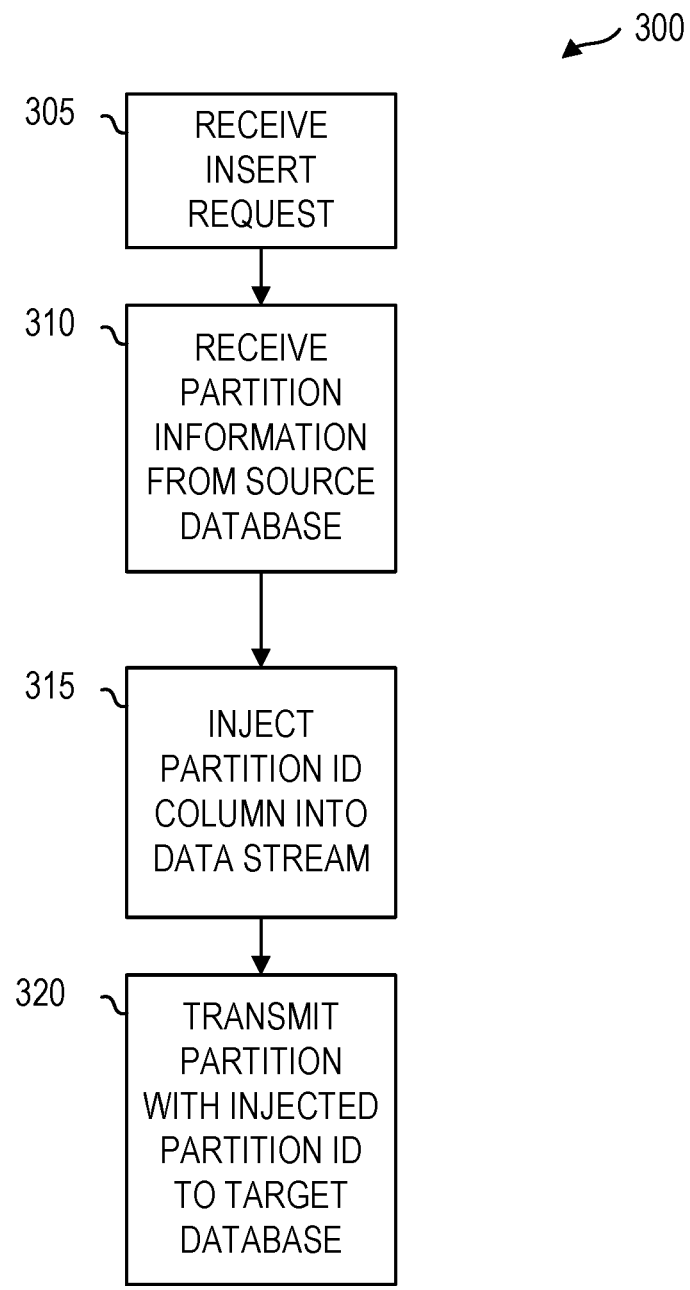
FIG. 3 is a flowchart of a process for performing an INSERT operation, according to some implementations.

FIG. 3 is a flowchart of an example process 300 for performing an INSERT operation, according to some implementations. In operation 305, the database accelerator 232 receives a single query language INSERT statement related to a source partition of a source table 214 in a source database system 210 that identifies a block of data spanning multiple partitions, each having a partition ID to be inserted into the target table, the INSERT statement containing no literal partition ID. The database accelerator 232 translates the INSERT statement for the target database system in order to inject the partition information using one of the three methods described above.

In operation 310, the database accelerator 232 receives partition ID information from the source database 212, and then, in operation 315, in some embodiments, the database accelerator 232 injects the partition IDs into a column of the rows in the partition data stream that is responsive to receiving the INSERT statement, but prior to inserting the rows into the target table. Operation 315 may make use of the shared memory location 234 that holds a particular partition ID for the row the database accelerator 232 is currently operating on. In operation 320, the database accelerator 232 transmits the partition with the injected partition ID into the target database.

Technical Application

The one or more embodiments disclosed herein accordingly provide an improvement to computer technology. For example, an improvement to operations in a database system allows for more efficient and effective utilization of computer resources in database operations.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing insertions into a target table of a target database system, comprising, with a processor:
    receiving a single query language INSERT statement related to a source partition of a source table in a source database system that identifies a block of data (BOD), having a partition identifier (PID), to be inserted into the target table, wherein the INSERT statement contains no literal PID;
    responsive to receiving the INSERT statement, receiving the BOD from the source table via a data stream; and
    inserting the BOD into the target table to result in a target table containing the BOD,
    wherein the data stream comprises a plurality of data streams that are demultiplexed on the source database system.

2. The method of claim 1, wherein a PID of each row of the BOD is inserted into a column of said each row after receiving the INSERT statement but prior to inserting said each row into the target table.

3. The method of claim 2, wherein the BOD is organized into a plurality of rows and each row is modified to contain a partition ID value so that the partition ID value is injected in the data stream.

4. The method of claim 1, further comprising:
specifying a shared memory location that contains a current PID; and
writing the current PID to the shared memory location, wherein the current PID is readable by the target database system.

5. The method of claim 1:
wherein the PID is specified in the data stream itself such that each batch of the BOD is preceded with a batch PID and a quantity of rows that the batch PID is applicable to;
the method further comprising:
reading and storing the batch PID and the quantity of rows; and
reading a number n of rows corresponding to the quantity of rows from the data stream and processing each read row with the read batch PID.

6. The method of claim 1, further comprising performing the demultiplexing, by the source database system, of rows in the BOD utilizing an unload utility that is started on the source database system in order to extract the BOD from the source table and populate the plurality of data streams.

7. The method of claim 6, further comprising:
determining, for all logical nodes in the target database system, unload criteria that identity all rows that go into each respective logical node; and
starting the unload utility with the unload criteria.

8. The method of claim 1, further comprising:
recombining the plurality of data streams into a single data stream, wherein:
in the single data stream, granularity is on blocks or batches of rows instead of single rows; and
each batch has a header and the header indicates for which target node the block or batch is.

9. The method of claim 1, further comprising sending directly to the target node on the target database system, the data streams resulting from the demultiplexing of the data on the source database system.

10. A system for processing insertions into a target table of a target database system, comprising:
a memory; and
a processor, that is configured to:
receive a single query language INSERT statement related to a source partition of a source table in a source database system that identifies a block of data (BOD), having a partition identifier (PID), to be inserted into the target table, wherein the INSERT statement contains no literal PID;
responsive to the receipt of the INSERT statement, receive the BOD from the source table via a data stream; and
insert the BOD into the target table to result in a target table containing the BOD;
wherein the data stream comprises a plurality of data streams that are demultiplexed on the source database system.

11. The system of claim 10, wherein the processor is further configured to insert a PID of each row of the BOD into a column of said each row after receiving the INSERT statement but prior to an insert of said each row into the target table.

12. The system of claim 11, wherein the BOD is organized into a plurality of rows and the processor is configured to modify each row to contain a partition ID value so that the partition ID value is injected in the data stream.

13. The system of claim 10, wherein the processor is further configured to:
specify a shared memory location that contains a current PID; and
write the current PID to the shared memory location, wherein the current PID is readable by the target database system.

14. The system of claim 10, wherein the PID is specified in the data stream itself such that each batch of the BOD is preceded with a batch PID and a quantity of rows that the batch PID is applicable to;
wherein the processor is further configured to:
read and store the batch PID and the quantity of rows; and
read a number n of rows corresponding to the quantity of rows from the data stream and process each read row with the read batch PID.

15. The system of claim 10, wherein a processor of the source database system is configured to demultiplex rows in the BOD utilizing an unload utility that is started on the source database system in order to extract the BOD from the source table and populate the plurality of data streams.

16. The system of claim 15, wherein the processor is further configured to:
determine, for all logical nodes in the target database system, unload criteria that identity all rows that go into each respective logical node; and
start the unload utility with the unload criteria.

17. A computer program product for processing insertions into a target table of a target database system, the computer program product comprising a computer readable storage medium having computer-readable program code embodied therewith, to, when executed on a processor:
receive a single query language INSERT statement related to a source partition of a source table in a source database system that identifies a block of data (BOD), having a partition identifier (PID), to be inserted into the target table, wherein the INSERT statement contains no literal PID;
responsive to the receipt of the INSERT statement, receive the BOD from the source table via a data stream; and
insert the BOD into the target table to result in a target table containing the BOD;
wherein the data stream comprises a plurality of data streams that are demultiplexed on the source database system.

18. The computer program product of claim 17, wherein the instructions further cause the processor to insert a PID of each row of the BOD into a column of said each row after receiving the INSERT statement but prior to an insert of said each row into the target table.

* * * * *